(12) United States Patent
Sivakumar

(10) Patent No.: US 11,178,270 B2
(45) Date of Patent: Nov. 16, 2021

(54) DYNAMIC SECONDARY PHONE BOOK

(71) Applicant: Conversant Wireless Licensing S.à r.l., Luxembourg (LU)

(72) Inventor: Tatikonda Sivakumar, Tokyo (JP)

(73) Assignee: Conversant Wireless Licensing S.à r.l., Luxembourg (LU)

(*) Notice: Subject to any disclaimer, the term of this patent is extended or adjusted under 35 U.S.C. 154(b) by 308 days.

(21) Appl. No.: 15/083,138

(22) Filed: Mar. 28, 2016

(65) Prior Publication Data

US 2016/0330304 A1 Nov. 10, 2016

Related U.S. Application Data

(63) Continuation of application No. 11/931,649, filed on Oct. 31, 2007, now abandoned.

(51) Int. Cl.
| | |
|---|---|
| *H04M 1/72457* | (2021.01) |
| *H04M 3/42* | (2006.01) |
| *H04M 1/2757* | (2020.01) |
| *H04W 12/082* | (2021.01) |
| *H04W 4/021* | (2018.01) |
| *H04W 12/06* | (2021.01) |
| *H04W 4/80* | (2018.01) |
| *H04W 8/24* | (2009.01) |
| *H04W 8/18* | (2009.01) |
| *H04M 1/72412* | (2021.01) |
| *H04W 84/12* | (2009.01) |
| *H04W 88/06* | (2009.01) |

(52) U.S. Cl.
CPC ..... *H04M 1/72457* (2021.01); *H04M 1/2757* (2020.01); *H04M 3/42178* (2013.01); *H04W 4/021* (2013.01); *H04W 12/06* (2013.01); *H04W 12/082* (2021.01); *H04M 1/72412* (2021.01); *H04M 2207/18* (2013.01); *H04M 2242/14* (2013.01); *H04M 2242/15* (2013.01); *H04M 2250/02* (2013.01); *H04M 2250/06* (2013.01); *H04W 4/80* (2018.02); *H04W 8/183* (2013.01); *H04W 8/245* (2013.01); *H04W 84/12* (2013.01); *H04W 88/06* (2013.01)

(58) Field of Classification Search
CPC .............................................. H04M 1/274516
See application file for complete search history.

(56) References Cited

U.S. PATENT DOCUMENTS

| | | | | |
|---|---|---|---|---|
| 2001/0046854 | A1* | 11/2001 | Henry | H04W 8/245 |
| | | | | 455/419 |
| 2002/0068599 | A1* | 6/2002 | Rodriguez | H04M 1/274516 |
| | | | | 455/564 |
| 2004/0085947 | A1* | 5/2004 | Ekberg | H04W 48/16 |
| | | | | 370/349 |

(Continued)

*Primary Examiner* — Kent W Chang
*Assistant Examiner* — Chayce R Bibbee
(74) *Attorney, Agent, or Firm* — Conversant IP Wireless

(57) ABSTRACT

A mobile communication device is equipped with a dynamic local directory into which contact information from a local telephone directory may be downloaded on a temporary basis. The local telephone directory resides on a local communication network and may be accessed by the mobile communication device. The downloaded data is purged automatically after preset limits are reached. The dynamic local telephone directory on the mobile communication device is continuously changing depending on the location.

11 Claims, 7 Drawing Sheets

(56) References Cited

U.S. PATENT DOCUMENTS

2004/0203746 A1* 10/2004 Knauerhase .... H04M 1/274516
 455/432.1
2008/0147685 A1* 6/2008 Mock ................ G06F 17/30575

* cited by examiner

DYNAMIC SECONDARY PHONE BOOK

CROSS-REFERENCE TO RELATED APPLICATION(S)

This application is a continuation of U.S. patent application Ser. No. 11/931,649, filed on Oct. 31, 2007, the disclosure of which is hereby incorporated by reference in its entirety.

BACKGROUND

1. Technical Field

The disclosed embodiments generally relate to communications by a mobile device using a locally accessible phone directory and in particular to accessing contact information for a specific location, business entity, network, or the like.

2. Brief Description of Related Developments

Phone directories and contact information stored on a mobile telephone are limited by useable memory and the need to continuously add and update numbers. Although this may be accomplished by downloading from available data bases located on a personal computer, network server or other source, it becomes cumbersome when there is a need for local contact data that is temporary. For example, a sales executive visiting the head office may desire access to contact details for important people in the office. Similarly, a patient in a hospital may desire to have access of important contacts to access services, make appointments, check on bills, etc.

In the current state of the art, users need to manually pull the details of the contacts and feed them to an address book or other contact application on the mobile device. Later these entries will need to be deleted when the user finds that he/she no longer needs these contact details to avoid overwhelming available memory.

The problem to which this application is directed is different from the dynamic phonebook entries that might be automatically be updated based on available data sources. For example, phone numbers for taxi service, pizza service, or some other local services which users widely expect to be available, but the details are location dependent. In these cases it is possible to define a dynamic phonebook entry that could be automatically updated by communicating with a local operator, or local service provider when visiting or anticipating a visit to a new or infrequently visited locale, business, facility, or network, but would be automatically deleted after a period of time or when the user is no longer in the relevant locality.

It would be advantageous to provide a mobile communications device with the ability to access a local phone directory to obtain contact information related to a particular location. In an embodiment of this application, a phonebook is provided that is different from location to location. Its utility for the user is limited by the location, and the time duration of the visit or need. For example, hospital phone book may be useful only if somebody is staying at the hospital or has business with the hospital and therefore would expire after a period of the time, during the stay or business dealings. Therefore this local phone book is dynamic and limited by the location and the time of the need.

It would be also advantageous that this dynamic local phone directory incorporate a secure access. Local phone book data would not be transferred to a user without authentication, and also such temporary users would not be given access to all the information. For example, a client visiting an office might be allowed to have access to the phone book entries of his host(s,) reception, helpdesk, or some other relevant people, but not to all the information in the phone book. Similarly a user would need to authenticate the service, and set the limits of the need in scope and duration.

SUMMARY

According to one aspect of this application, a communication network is provided with a server, which at least in part is constructed to store a local phone directory having contact information pertinent to the network location. A communications interface is equipped to allow incoming calls for the purpose of accessing the local directory. A mobile communication device is adapted to establish a communication link with the server and provide the server with the necessary identification as an authorized user of the local phone directory. After the link is established and authentication is accomplished, the user of the mobile communication device may obtain contact data from the local phone directory while in the locality or for a predetermined limited time period.

In another aspect of this application, a user's mobile communications device may be automatically contacted by a local network and the user provided with the opportunity to acquire local contact information. This can be prompted by sensing the location of the user equipment (UE) and initiating a link via WLAN, Bluetooth, ultrawide band, WiFi, WiMax, referred to as secondary local communications. The user could authenticate and accept or reject the offer of local contact data.

In another aspect of this application, the local communications network server includes an accessible local telephone directory with contact information for the associated business, organization, school, hospital, building, or other facility or locale with associated local directory of contact information. The local telephone directory includes a communications interface that provides a portal to the directory for users visiting the locale. A user would provide identification sufficient to authenticate the request for access and then would be permitted to download the contact information. The network server would then provide the communication interface to allow the user to access the local network using the contact information and thereby become a virtual internal phone.

BRIEF DESCRIPTION OF THE DRAWINGS

The foregoing aspects and other features of the embodiments are explained in the following description, with reference to the accompanying drawings, in which.

DETAILED DESCRIPTION

Figure 1:
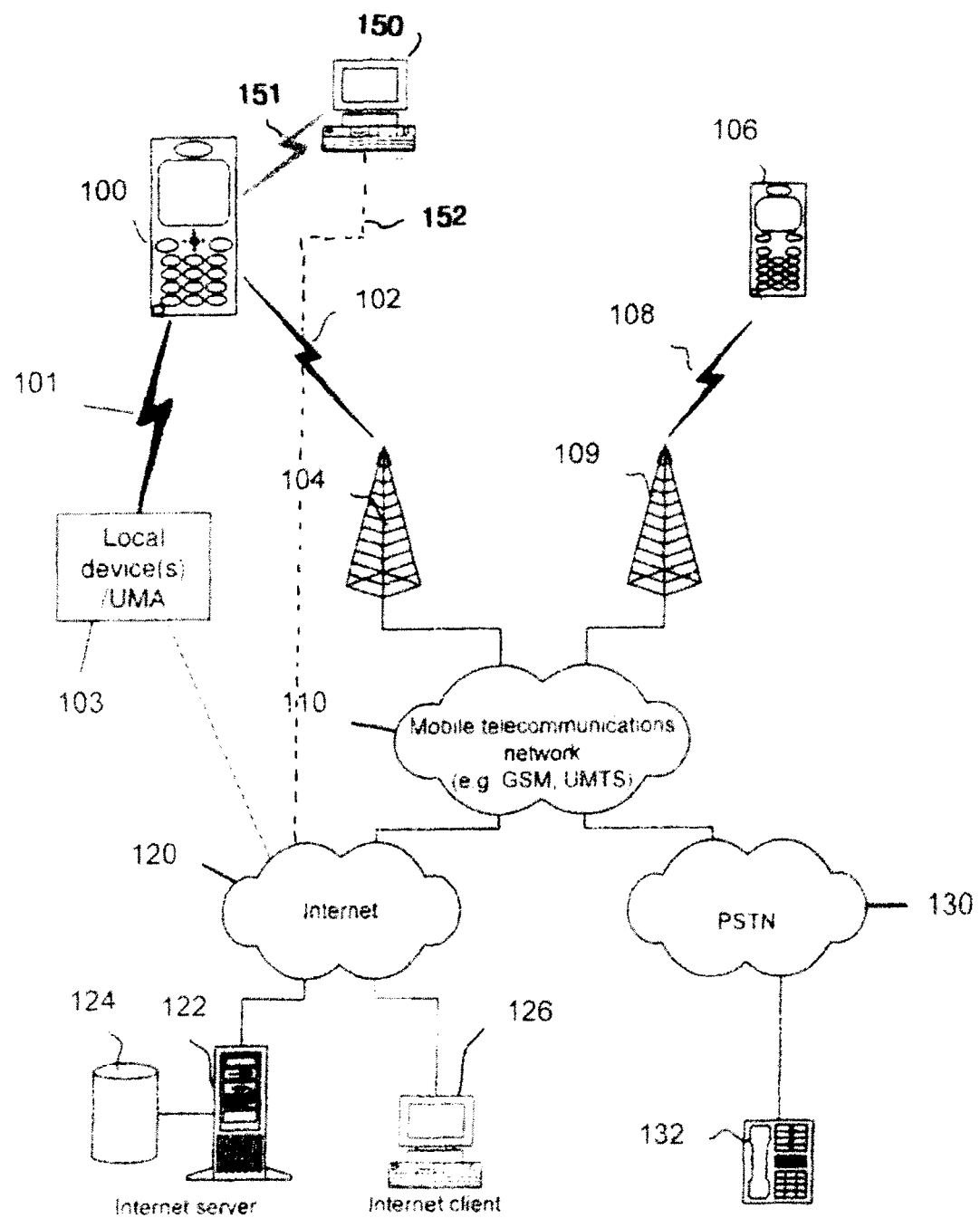
FIG. 1 shows a schematic illustration of a cellular telecommunication system, as an example of an environment in which aspects of the embodiments may be applied.

FIG. 1 is a schematic illustration of a cellular telecommunications system, as an example, of an environment in which a communications device 100 incorporating features of an exemplary embodiment may be applied. Although the embodiments disclosed will be described with reference to the drawings, it should be understood that they may take many alternate forms. In addition, any suitable size, shape, type of elements or combination of components could be used.

In the telecommunication system of FIG. 1, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 100 and other devices, such as another mobile terminal 106, a stationary telephone 132, a personal computer 151 or an internet server 122. It is to be noted that for different embodiments of the mobile terminal 100 and in different situations, some of the telecommunications services indicated above may or may not be available. The aspects of the invention are not limited to any particular set of services in this respect.

The mobile terminals 100, 106 may be connected to a mobile telecommunications network 110 through radio frequency (RF) links 102, 108 via base stations 104, 109. The mobile telecommunications network 110 may be in compliance with any commercially available mobile telecommunications standard such as GSM, UMTS, D-AMPS, CDMA2000, FOMA and TD-SCDMA.

The mobile telecommunications network 110 may be operatively connected to a wide area network 120, which may be the internet or a part thereof. An internet server 122 has data storage 124 and is connected to the wide area network 120, as is an internet client computer 126. The server 122 may host a www/hap server capable of serving www/hap content to the mobile terminal 100.

A public switched telephone network (PSTN) 130 may be connected to the mobile telecommunications network 110 in a familiar manner. Various telephone terminals, including the stationary telephone 132, may be connected to the PSTN 130.

The mobile terminal 100 is also capable of communicating locally via a local link 101 or 151 to one or more local devices 103 or 150. The local links 101 or 151 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 103 can, for example, be various sensors that can communicate measurement values to the mobile terminal 100 over the local link 101. The above examples are not intended to be limiting, and any suitable type of link may be utilized. The local devices 103 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 100 may thus have multi-radio capability for connecting wirelessly using mobile communications network 110, WLAN or both. Communication with the mobile telecommunications network 110 may also be implemented using WiFi, WiMax, or any other suitable protocols, and such communication may utilize unlicensed portions of the radio spectrum (e.g. unlicensed mobile access (UMA)).

As shown in FIG. 1, a computer device 151, for example, a personal computer (PC), laptop computer or other computer device capable of executing a variety of applications, is connected to mobile communication terminal 100 by a local link 151, as described above. In other alternate embodiments, the computer device 150 may be a tablet computer, a laptop or desktop computer, a television or television set top box or any other suitable device capable of driving a display and having supporting electronics, such as central processing unit 411 and memory 414. Computer device 150 may also be connected via broadband, cable, PSTN or other means of communication to Internet server 122. The system illustrated may be adapted to facilitate the functions of the disclosed embodiments described below.

Figure 2A:
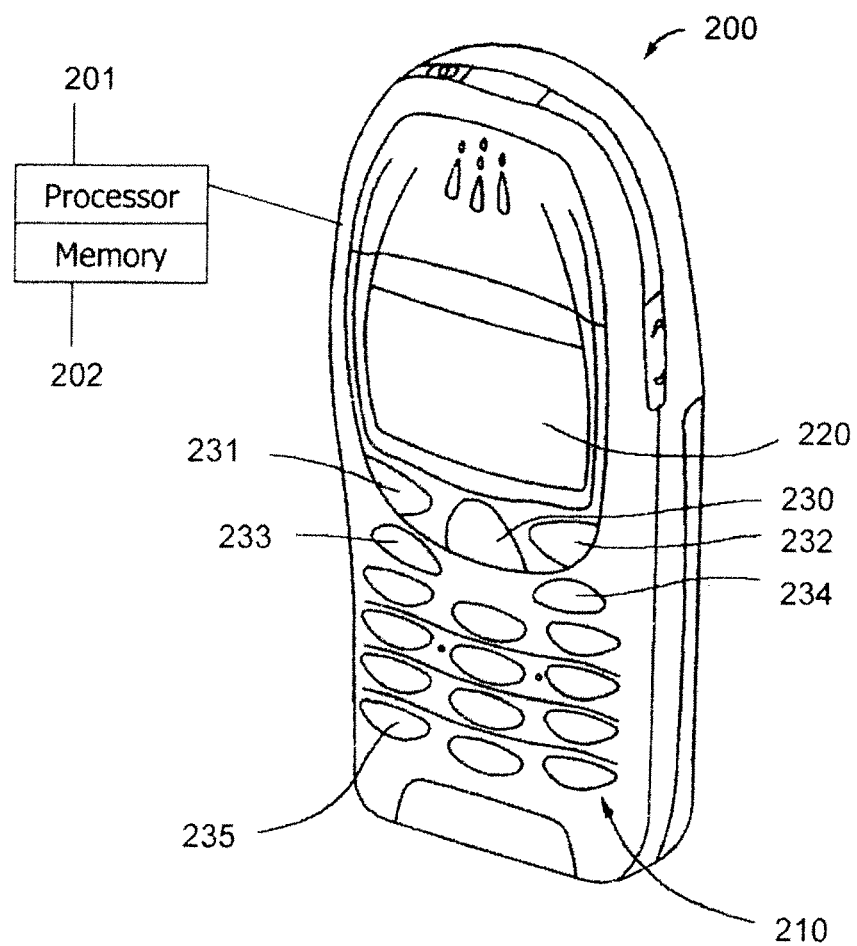
FIG. 2a shows a perspective view of one embodiment of a mobile communication device in which aspects of the disclosed embodiments may be applied.

One embodiment 200 of a terminal 100 is illustrated in more detail in FIG. 2A. The terminal or mobile communications device 200 may have a keypad 210 and a display 220. The keypad 210 may include any suitable user input devices such as, for example, a multi-function/scroll key 230, soft keys 231, 232, a call key 233 and end call key 234 and alphanumeric keys 235. The display 220 may be any suitable display, such as for example, a touchscreen display or graphical user interface. The display may be integral to the device 200 or the display may be a peripheral display connected to the device 200. A pointing device, such as for example, a stylus, pen or simply the user's finger may be used with the display 220. In alternate embodiments any suitable pointing device may be used. In other alternate embodiments, the display may be a conventional display. The device 200 may also include other suitable features such as, for example, a camera, loud speaker, connectivity port or tactile feedback features. The mobile communications device may have a processor 201 connected to the display for processing user inputs and displaying information on the display 220. A memory 202 may be connected to the processor 201 for storing any suitable information and/or applications associated with the mobile communications device 200 such as phone book entries, calendar entries, etc.

Figure 2B:
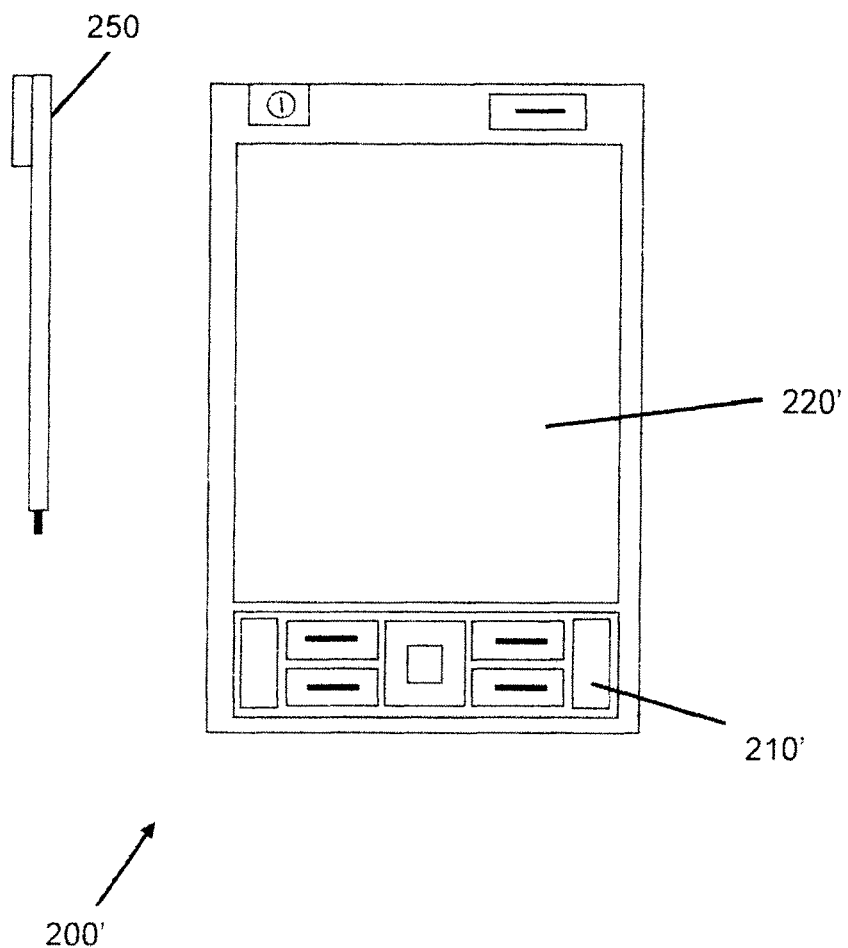
FIG. 2b shows a perspective view of another embodiment of a mobile communication device in which aspects of the disclosed embodiments may be applied.

In one embodiment, the device 100, may be for example, a PDA style device 200' illustrated in FIG. 2B. The PDA 200' may have a keypad 210', a touch screen display 220' and a pointing device 250 for use on the touch screen display 220'. The exemplary embodiments herein will be described with reference to the mobile communications device 100 for exemplary purposes only with the understanding that the embodiments could be applied equally to any suitable mobile device incorporating a display, processor, memory with supporting software or hardware and a mobile communication capability.

Figure 3:
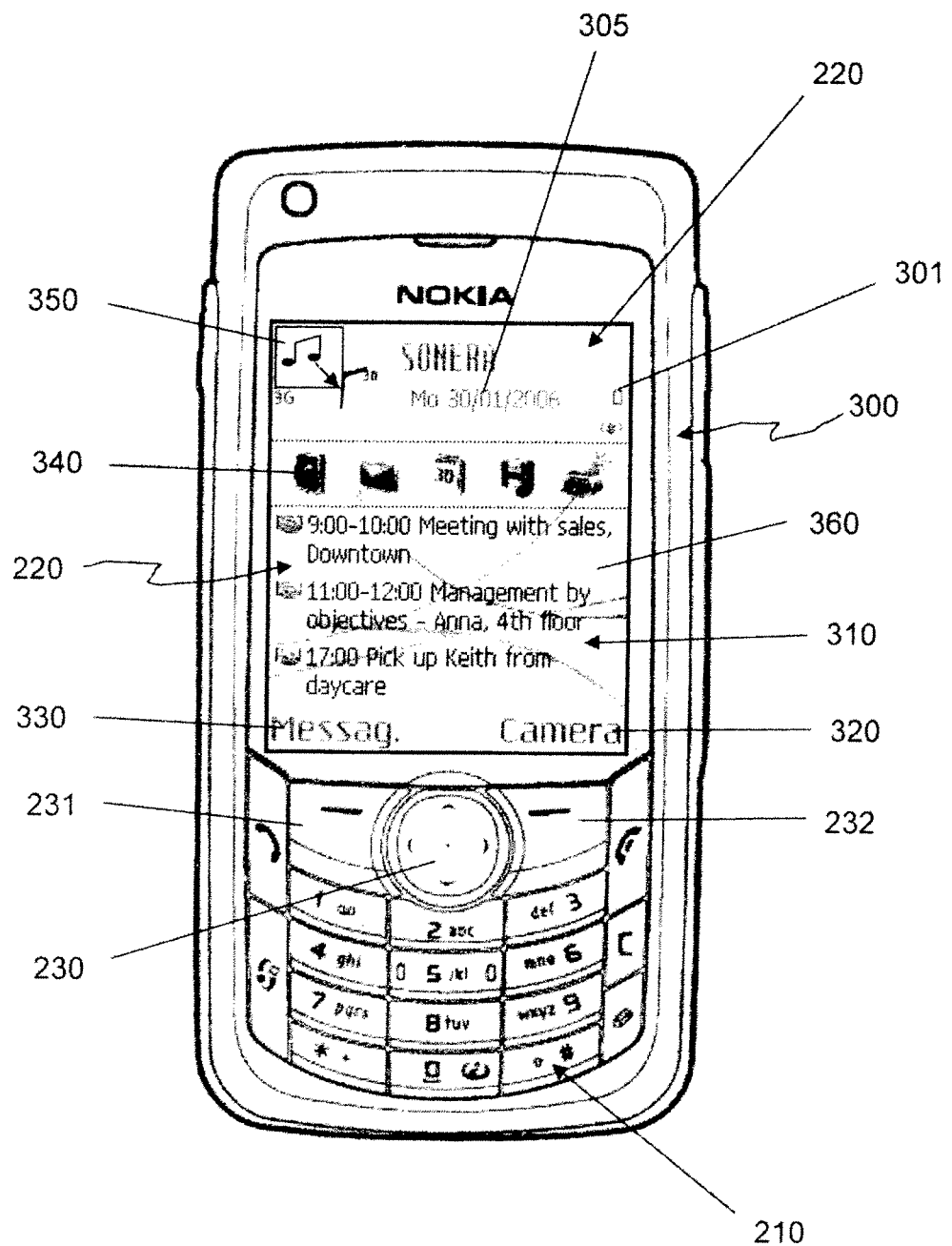
FIG. 3 shows a user interface for an embodiment of a mobile communication device in which aspects of the disclosed embodiments may be applied.

FIG. 3 illustrates a user interface 300 of the type that may be useful in the mobile communication device 100. The user interface may include display 220. The display 220 of the device 100 may include an application section 310, soft key functions 320, 330, an application bar 340, a battery indicator 301, the date 305 and any other suitable information or items. The application bar 340 may allow a user to select an application stored in the device. For example, as can be seen in FIG. 3, the application bar 340 may include a phone book, email or other messaging application, a calendar, video player, printing function and any other suitable applications. The user may use the scroll or navigation key 230 to scroll through and select an application from the application bar 340. In alternate embodiments the applications may be scrolled through and selected in any suitable manner such as, for example, via a menu of the device or with a stylus interacting with a touch screen display.

In the example of FIG. 3 the calendar function is selected for presentation on the display 220. The user's calendar entries may be presented in the application section for viewing or modification by the user. In this example, the application section 310, soft key functions 320, 330, an application bar 340, a battery indicator 301, the date 305 will collectively be referred to herein as the native application 360 (e.g. the native application is the display screen that is presented on the display before the user activates a transparent application functionality of the device as will be described in greater detail below). In alternate embodiments, the native application may be any suitable portion of the display screen including any suitable application that is running on the device.

Figure 4:
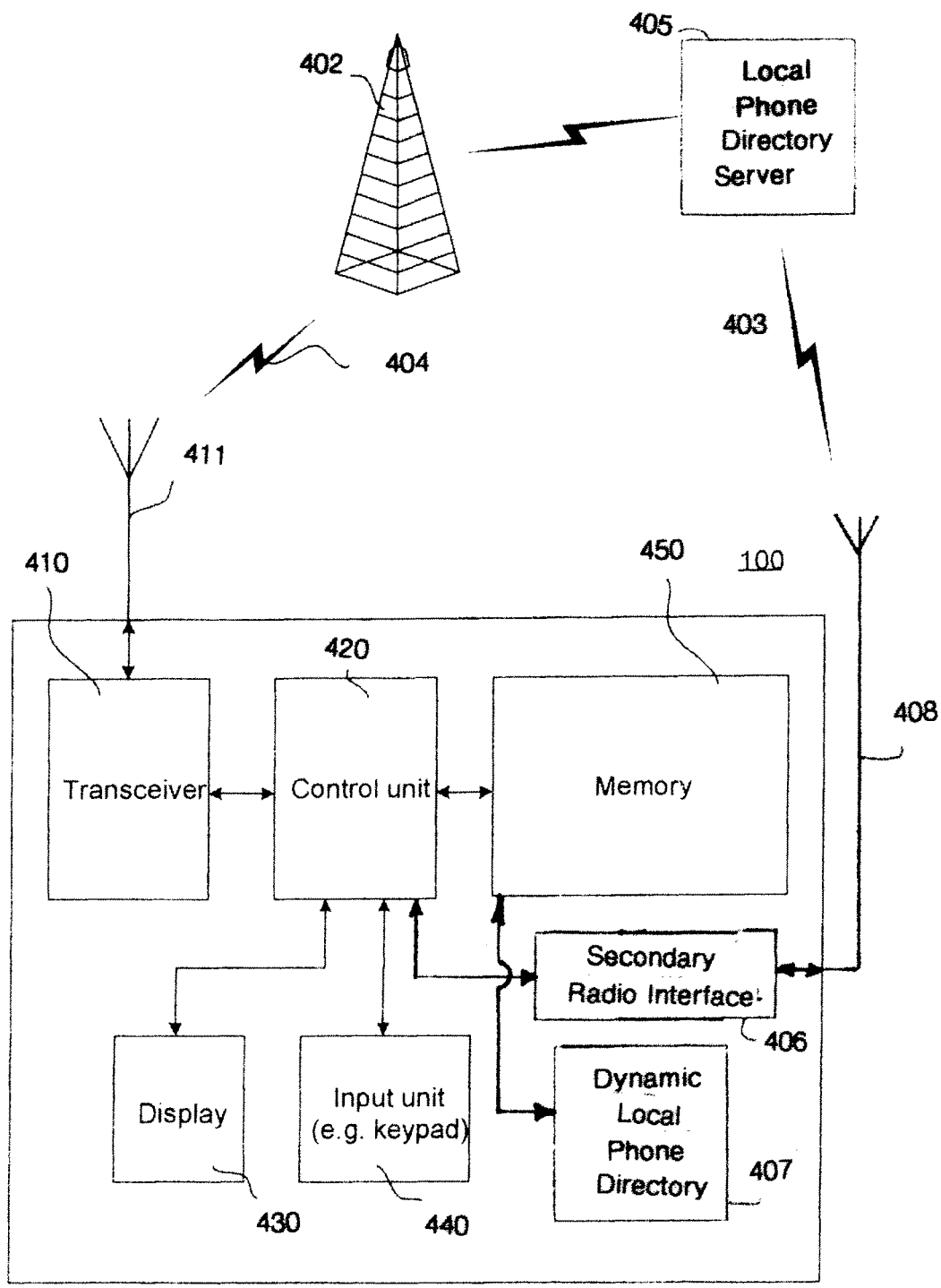
FIG. 4 is a block diagram of the mobile communications device of FIG. 3 associated with a local network.

FIG. 4 is a schematic block diagram of a mobile telecommunication terminal 100 within a local communications network according to an exemplary embodiment of the present invention. A transceiver 410 is used for communicating with a base station 402 via an antenna 411. The base station 402 may be in communication via a local communications network (not shown) to a local phone directory server 405 via link 404. Communication with local phone directory server 405 could also be established by a secondary radio interface 406, such as blue tooth, infrared, or other means via antenna 408 and link 403. As indicated in FIG. 1 the communications may also be established through other means, e.g. a public switched telephone network (PSTN). The terminal 100 and the network in which the terminal is operating are generally adapted to support IP traffic, for example, WLAN, BT, UWB, Wifi, WiMax, IP-Pass-through and other wireless or wired interfaces for communication.

Within mobile communication device 100, a control unit 420 is coupled to the transceiver 410. The control unit 420 may comprise signal processing circuitry in order to process e.g. voice data and message data (e.g. SMS or MMS) from a user of the mobile telecommunication terminal 100 and provide the transceiver 410 with the processed data for transmission to the base station 402 or other destinations. Likewise, the control unit 420 may comprise signal processing circuitry for processing data received from the other telecommunication terminals in order to provide the user of the mobile telecommunication terminal 100 with e.g. audio, image, video or message data. Alternatively (not shown) some or all of the signal processing functionality may be provided by specialized circuitry in the mobile telecommunication terminal 100.

The control unit 420 is coupled to a display 430 for providing a user of the mobile telecommunication terminal 100 with visual data regarding e.g. a specific call in progress, telecommunication numbers stored in the mobile telecommunication terminal 100, signal strength of the wireless communication links 403 and 404, messages received from other mobile telecommunication terminals, etc.

The control unit 420 is moreover coupled to an input unit 440, which may be in the form of a keyboard/keypad; an on-screen touch-sensitive keyboard; a navigation wheel or joystick for scrolling and selecting items, digits and/or characters shown on the display 430; etc.

A memory 450 is connected to the control unit 420. The memory 450 may be a single memory or many different memories implemented on different chips, alone or together with other electronic circuitry, by means of different technologies (such as RAM, ROM, EPROM, EEPROM, Flash, etc) which all are accessible by the control unit 420.

In the exemplary embodiment of FIG. 4, the user equipment, i.e. mobile communication device 100 includes a dynamic local phone directory software module 407 stored in or in cooperation with memory 450. The software module 407 is executed by control unit 420 in conjunction with memory 450 to establish communication with a network located at a particular facility in which the user of mobile communication device 100 is present. This could be at a business, manufacturing plant, hospital, chamber of commerce or other location where a local contact directory database is made available. The local contact database would include a software module that would complement the function of software module 407 and provide the interface for the user to communicate, authenticate, set up, and download the contact data that is temporarily needed to conduct business, utilize a service, or generally network with local personnel and businesses.

Figure 6:
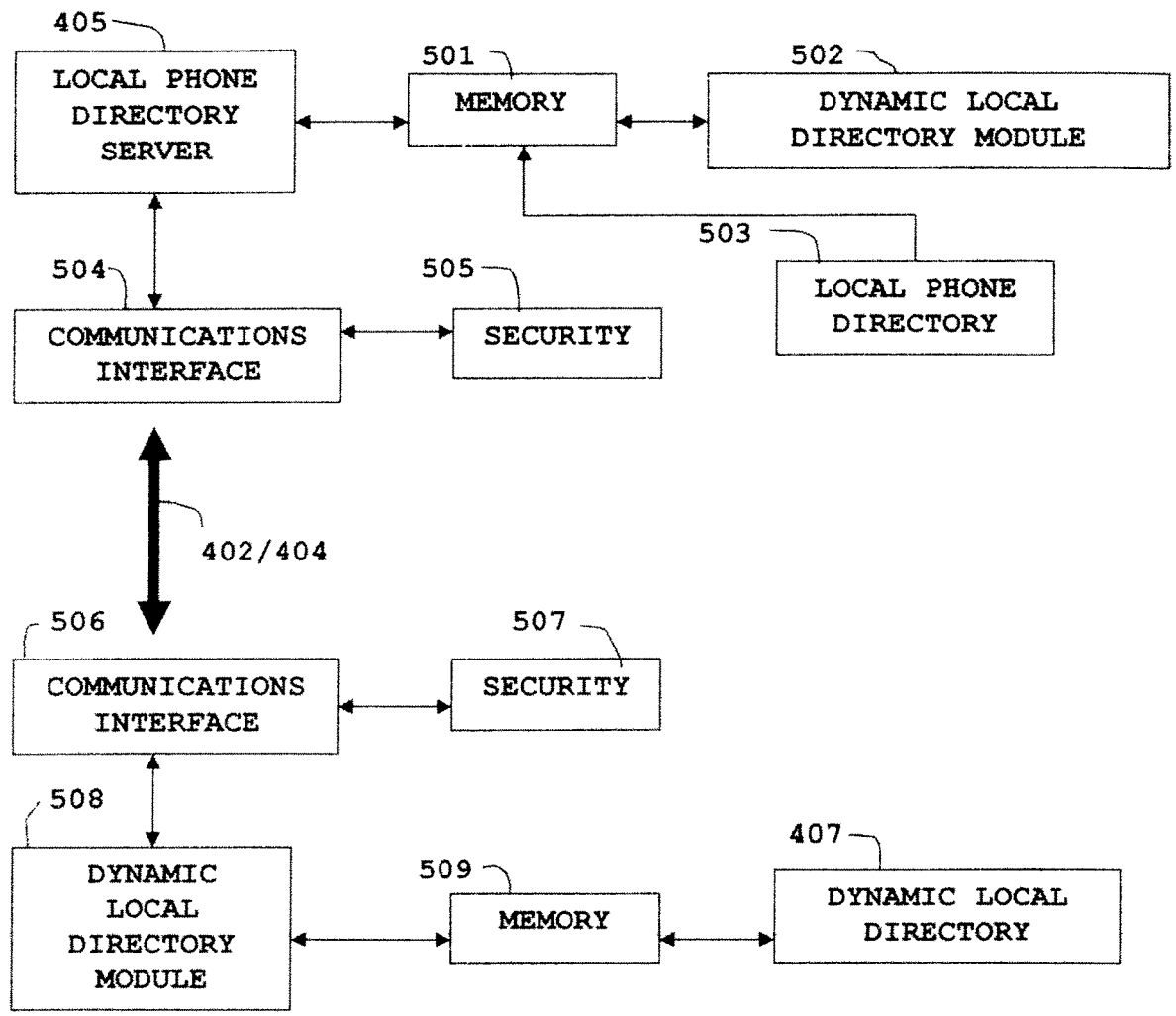
FIG. 6 is a block diagram illustrating the general architecture of the exemplary local system of FIG. 4.

In one embodiment of this invention, as shown in FIG. 6, the system of this invention includes the local communications network server 500, which could be any one of a number of the entities shown in FIG. 1 and be comprised of a wide variety of computers and processors linked for use with respect to a particular locale. As part of, or operatively associated with the local network server 500, there is a local phone directory network server 405 that stores and operates a database containing a local telephone directory 503. Directory 503 contains contact information for the associated business, organization, school, town, hospital, building, or other facility or locale. The contact information could include phone numbers, email addresses, screen names and other information. The local telephone directory server 405 includes a communications interface 504 that provides a portal to the directory for users visiting the locale and desiring temporary access to contact information.

A security module 505 is associated with the communications interface to provide a screening function that would record a request for access to the directory, including an identification of the user, and the particular communications device for the purposes of authenticating the request. In some instances, it is envisioned that a subscription style service may be provided with cooperatively responsive dynamic local software modules 502 and 508 present on the local directory server. With a subscription style service the user would apply for access in advance and provide the necessary security information to allow local phone directory server to verify the subscription. The might be provided by a communications service provider as part of a package of features.

Therefore the network side of the system would include local phone directory server 405 having a memory module 501 in which is stored the local phone directory database and application software 502 for operating the dynamic local directory feature. The user equipment 100 would also involve a communication interface 506 with appropriate security functions 507 that provide for information to be transmitted to the local phone directory server 405 for authentication and also permit a certain level of authentication by the user equipment 100 from the local phone directory server 405. Once cleared the communication link 403/404 may be established and contact data downloaded to dynamic local directory 407 in memory 509 that is part of communication device 100. Dynamic local directory module 508 would provide the operation instructions for the processor 201 of UE 100.

Dynamic local directory modules 502 and 508 are designed to provide the cooperating parts of the system with necessary instructions to execute the dynamic directory feature. In one embodiment, the modules 502 and 508 would provide a structure for the download of data. As part of this structure, the contact information downloaded would be automatically deleted when the user equipment moves out of the local or a predetermined time limit expires. The deletion could also be deleted manually by the user. This allows for the stripping of obsolete contact data and restores memory capacity to allow further temporary downloads of local contact information from other local directories.

Figure 5:
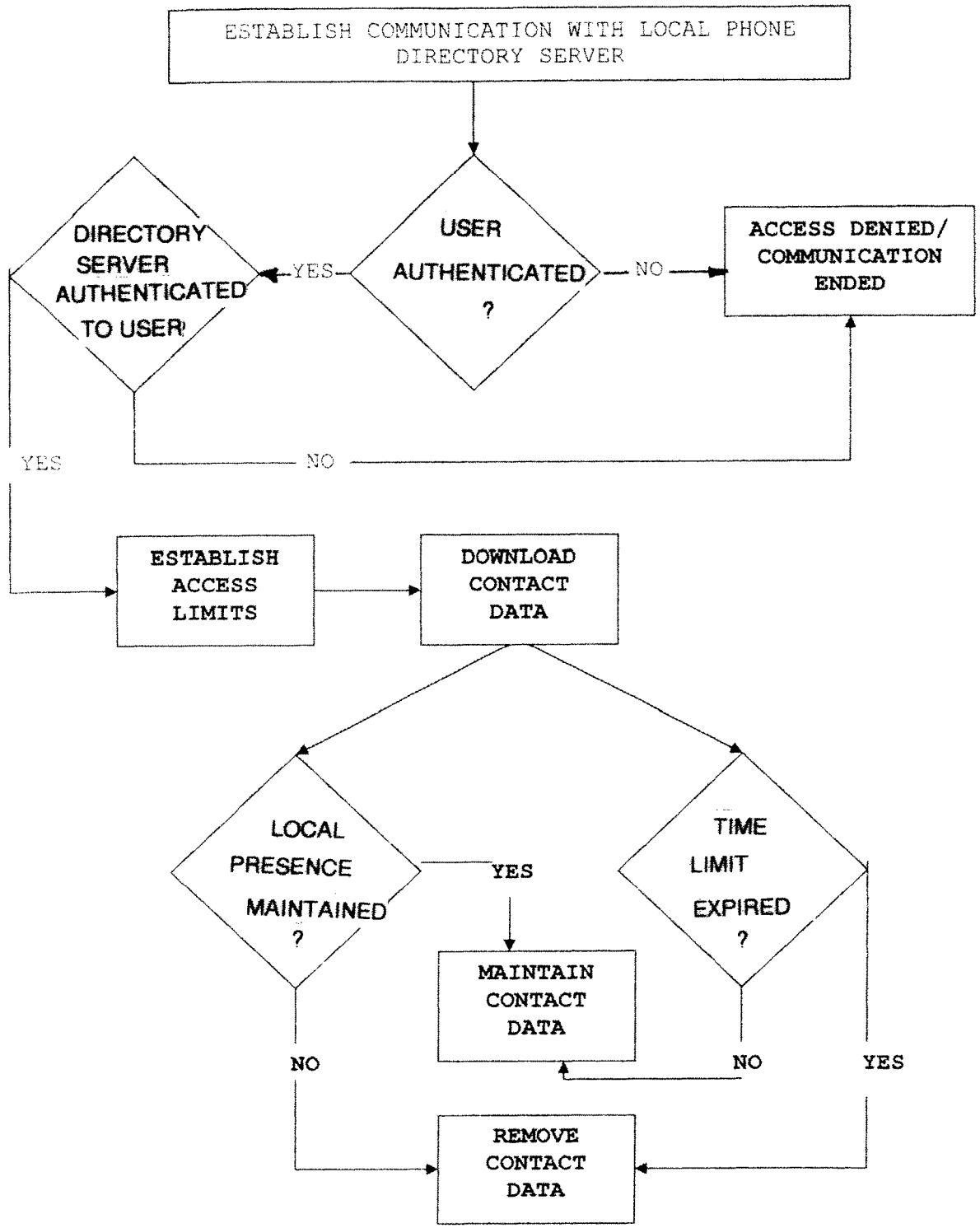
FIG. 5 is a flow diagram of a method in which aspects of the disclosed embodiments may be applied.

In an embodiment of this invention as shown in FIG. 5, the user equipment 100 would be carried into a facility, for example, a business or office within which the user wishes to conduct sales or other contact activities. Using UE 100, the user seeks to establish a link (600) with the local phone directory server associated with the internal communications network of the business. After a reciprocal authentication process is performed and accepted (610), a link is established between UE 100 and the local directory server 405. If authentication cannot be accomplished than access is denied and the communication is ended (680).

Before any data is downloaded the status of the user, i.e. subscriber, remote employee, visitor, etc. is obtained and access limits are set accordingly (620). In one embodiment the limits are set using a presence and/or time criteria, this could be prescribed by the subscription, by the user, or by the local directory server according to the user's status. The data is then downloaded (630) to the dynamic local directory 407 of the UE 100 and in this embodiment will be set to be removed (650) after a predetermined period, that could be hours, days, weeks or what is appropriate to the circumstances, has expired (640). In addition, a proximity limitation may be set and then the contact data would be removed after the user and user equipment 100 is removed from the locale (660). It is a feature of the dynamic local phone directory software that the local contact data obtained would be automatically purged when it is no longer needed. The dynamic local directory is continuously changing with time and location.

In one embodiment the contact information, would be pushed down from the local directory server 405. In this instance the communication link would be initiated by the local server 405 upon receiving information that indicates the presence of UE 100 within a target location. Authentication and downloading would occur in the same manner as in steps 610 to 680.

In another embodiment, the downloaded data would include access information and codes necessary to allow operation of the UE 100 as an internal communication device within the local network. In effect the UE 100 would become a fully functioning local phone in the local network for the duration of a visit.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

The invention claimed is:

1. A method comprising:
   using a mobile communication device, establishing a local link for communications with a local network server in a local network upon said mobile communication device being in a proximity of said local network;
   then authenticating the mobile communication device with the local network server over the local link;
   upon authenticating said mobile communication device with the local network server, accessing the local network server by the mobile communication device over the local link to download, from said local network server, data and codes that enable the mobile communication device to operate as an internal phone of said local network; and
   operating the mobile communication device as an internal communication device for communications in the local network over the local link.

2. The method of claim 1, wherein the accessing step downloads a portion of a directory of local contact information into a dynamic local directory on the mobile communication device;
   and wherein said dynamic local directory is continuously changed based on time and location.

3. The method according to claim 1 wherein the local link is a secondary radio link.

4. The method according to claim 1 wherein the secondary radio link is a wireless local area network, blue tooth, ultrawide band, Wifi or WiMax.

5. A mobile communication device comprising:
   a processor for executing the functions of the mobile communication device;
   a transceiver for establishing a local link for communication with a local network server in a local network upon said mobile communication device being in a proximity of said local network; and
   a memory;
   wherein the processor causes the mobile communication device to:
      establish, via the transceiver, a local link with said local network server;
      then authenticate said mobile communication device with said local network server over the local link;
      upon authenticating said mobile communication device with said local network server, access said local network server over the local link, via the transceiver, to download data and codes that enable the mobile communication device to operate as an internal phone of said local network; and
      operate said mobile communication device as an internal communication device for communications in the local network over the local link.

6. The mobile communications device of claim 5, wherein the processor causes said mobile communication device to access said local network to also download a portion of local contact information into a dynamic local directory in the memory of said mobile communication device;
   and wherein said dynamic local directory is continuously changed based on time and location.

7. The mobile communications device of claim 5, wherein the local link is a secondary radio link.

8. The mobile communications device of claim 7, wherein the secondary radio link is a wireless local area network, blue tooth, ultrawide band, Wifi or WiMax.

9. A non-transitory computer-readable storage device storing instructions that are executable at a mobile communications device to perform operations comprising:
   establishing, by said mobile communications device, a local link for communications with a local network server in a local network upon said mobile communication device being in a proximity of said local network;

then authenticating said mobile communication device with the local network server over the local link;

upon authenticating said mobile communication device with the local network server, accessing the local network server by said mobile communication device over the local link to download, from said local network server, data and codes that enable the mobile communication device to operate as an internal phone of said local network; and operating the mobile communication device as an internal communication device for communications in the local network over the local link.

10. The non-transitory computer-readable storage device of claim 9, wherein the accessing operation downloads a portion of a directory of local contact information into a dynamic local directory on the mobile communication device;

and wherein said dynamic local directory continuously changed based on time and location.

11. The non-transitory computer-readable storage device according to claim 9, wherein the local link is a wireless local area network, blue tooth, ultrawide band, Wifi or WiMax.

* * * * *